United States Patent

Peter et al.

[11] 3,821,194
[45] June 28, 1974

[54] WATER-INSOLUBLE MONOAZO DYESTUFS

[75] Inventors: Richard Peter, Basel; Hans-Joerg Angliker, Riehen; Klaus Artz, Muttenz, all of Switzerland

[73] Assignee: Ciba-Geigy AG, Basel, Switzerland

[22] Filed: Dec. 6, 1967

[21] Appl. No.: 688,350

[30] Foreign Application Priority Data
Dec. 27, 1966 Switzerland.................. 18616/66

[52] U.S. Cl................ 260/207, 260/152, 260/158, 260/207.1, 260/332.2 C, 260/347.4, 8/41 C
[51] Int. Cl. ............... C09b 29/08, C09b 29/36
[58] Field of Search ........ 260/152, 158, 207, 207.1

[56] References Cited
UNITED STATES PATENTS

| | | | |
|---|---|---|---|
| 2,249,749 | 7/1941 | Dickey et al.................. | 260/152 |
| 2,323,314 | 7/1943 | Dickey et al.................. | 260/207.1 |
| 2,373,700 | 4/1945 | McNally et al. .............. | 260/207.1 |
| 3,445,454 | 5/1969 | Fishwick et al................ | 260/207 |
| 3,533,722 | 10/1970 | Wegmuller....................... | 8/26 |
| 3,707,533 | 12/1972 | Pohl.................................. | 260/207 |

FOREIGN PATENTS OR APPLICATIONS

| | | | |
|---|---|---|---|
| 852,396 | 10/1960 | Great Britain................ | 260/207.1 |
| 1,461,855 | 11/1966 | France............................ | 260/207.1 |
| 910,306 | 11/1962 | Great Britain................ | 260/207.1 |
| 1,356,648 | 2/1964 | France............................ | 260/158 |

*Primary Examiner*—Lorraine A. Weinberger
*Assistant Examiner*—C. F. Warren
*Attorney, Agent, or Firm*—Joseph G. Kolodny; Stanley Marcus; Edward McC. Roberts

[57] ABSTRACT

Water-insoluble monoazo dyestuffs of the formula

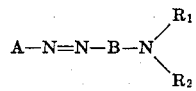

in which A represents the radical of a diazo component, B represents a paraphenylene residue that may be substituted, $R_1$ represents an alkyl group that may be substituted by groups other than benzoyloxy groups and $R_2$ represents a residue of the formula —alkylene—O—$COR_3$, in which $R_3$ represents a benzene residue free from hydroxyl or carbalkoxy groups, a phenalkyl group, a styryl group, a five-membered heterocyclic residue or a nitrogen-free, six-membered heterocyclic residue, are useful for dyeing or printing polyester fibers in orange to blue tints fast to light and sublimation.

7 Claims, No Drawings

WATER-INSOLUBLE MONOAZO DYESTUFS

The present invention provides, as new compounds, water-insoluble azo dyestuffs of the general formula

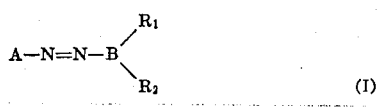

(I)

in which A represents the residue of a diazo component, B represents a para-phenylene residue that may be substituted, $R_1$ represents an alkyl group that may be substituted by groups other than benzoyloxy groups and $R_2$ represents a residue of the formula —alkylene—O—COR$_3$ in which $R_3$ represents a benzene residue free from hydroxyl or carbalkoxy groups, a phenalkyl group, a styryl group, a five-membered heterocyclic residue or a nitrogen-free six-membered heterocyclic residue.

The invention also provides a process for the manufacture of water-insoluble azo dyestuffs of the above general formula, which comprises: (a) coupling a diazotized amine with an amine of the formula

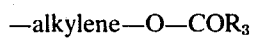

or (b) monoacylating or diacylating an azo dyestuff of the formula

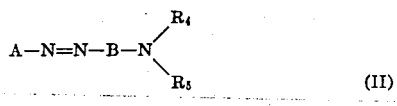

(II)

in which A and B have the meanings given above, $R_4$ represents an alkyl group that may be substituted and $R_5$ represents a hydroxyalkyl group, with a halide or an anhydride of a five-membered heterocyclic carboxylic acid, a six-membered, nitrogen-free heterocyclic carboxylic acid, a cinnamic acid or a phenylalkane-carboxylic acid acid, and/or monoacylating an azo dyestuff of the above formula (II) with a benzoic acid halide or anhydride which is free from hydroxyl and carbalkoxy groups.

Preferred diazo components are aminobenzenes of the formula

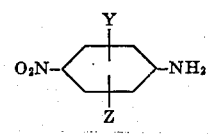

in which Y represents a hydrogen or a halogen atom or an alkyl, alkoxy, phenoxy, nitro, cyano, carbalkoxy or alkylsulphonyl group and Z represents a hydrogen or a halogen atom or an alkyl, cyano or trifluoromethyl group. The following amines may be mentioned as examples: 1-amino-4-chlorobenzene, 1-amino-4-bromobenzene, 1-amino-4-methylbenzene, 1-amino-4-nitrobenzene, 1-amino-4-cyanobenzene, 1-amino-2,5-dicyanobenzene, 1-amino-4-methylsulphonylbenzene, 1-amino-4-carbalkoxybenzene, 1-amino-2,4-dichlorobenzene, 1-amino-2,4-dibromobenzene, 1-amino-2-methyl-4-chlorobenzene, 1-amino-2-trifluoromethyl-4-chlorobenzene, 1-amino-2-cyano-4-chlorobenzene, 1-amino-2-carbomethoxy-4-chlorobenzene, 1-amino-2-carbomethoxy-4-nitrobenzene, 1-amino-2-chloro-4-cyanobenzene, 1-amino-2-chloro-4-nitrobenzene, 1-amino-2-phenoxy-4-nitrobenzene, 1-amino-2-chloro-4-carbethoxybenzene, 1-amino-2-chloro-4-methylsulphonylbenzene, 1-amino-2-methylsulphonyl-4-chlorobenzene, 1-amino-2-methylsulphonyl-4-nitrobenzene, 1-amino-2,4-dinitrobenzene, 1-amino-2,4-dicyanobenzene, 1-amino-2-cyano-4-methyl-sulphonylbenzene, 1-amino-2,6-dichloro-4-cyanobenzene, 1-amino-2,6-dichloro-4-nitrobenzene, 1-amino-2,4-dicyano-6-chlorobenzene, 1-amino-2,4-dinitro-6-chlorobenzene and especially 1-amino-2-cyano-4-nitrobenzene.

A heterocyclic diazo component of which special mentioned may be made is 2-amino-5-nitrothiazole; others that may be used are as follows: 2-aminothiazole, 2-amino-5-nitrothiazole, 2-amino-5-cyanothiazole, 2-amino-4-methyl-5-nitrothiazole, 2-amino-4-methylthiazole, 2-amino-4-phenyl-thiazole, 2-amino-4-(4'-chloro)-phenyl-thiazole, 2-amino-4-(4'nitro)-phenylthiazole, 2-amino-6-chlorobenzthiazole, 2-amino-6-canobenzthiazole, 2-amino-6-nitrobenzthiazole, 2-amino-1,3,4-thiadiazole and 2-amino-1,3,5-thiadiazole.

The coupling components used in accordance with the invention preferably correspond to the formula

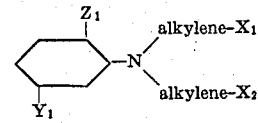

in which $X_1$ represents a hydrogen atom or an alkoxy, cyanoalkoxy, phenyl or cyano group or a hydroxyl group acylated by the residue of an aliphatic carboxylic acid, cinnamic acid or phenylalkanoic acid, the residue of a five-membered heterocyclic carboxylic acid or the residue of a six-membered, nitrogen-free heterocyclic carboxylic acid, $X_2$ represents a residue of the formula —OCOR$_3$, in which $R_3$ has the meaning given above, and in which $Y_1$ represents a hydrogen or a halogen atom or an alkyl, alkoxy, aryloxy or acylamino group and $Z_1$ represents a hydrogen atom or an alkyl or alkoxy group.

Coupling components which are of special interest are those of the formula

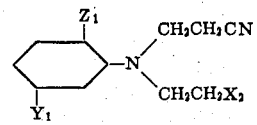

in which $Y_1$, $Z_1$ and $X_2$ have the meanings given above.

The following amines may be mentioned as examples: N-ethyl-N-β-benzoyloxyethylaniline, N-β-methoxyethyl-N-β-benzoyloxyethylaniline, N-β-cyanoethoxyethyl-N-β-benzoyloxyethylaniline, N-β-cyanoethyl-N-β-benzoyloxy-ethylaniline, N-β-acetoxyethyl-N-β-benzoyloxyethyl-aniline, N-β-propionoxyethyl-N-β-benzoyloxyethyl-aniline, N-β-carbomethoxyethyl-N-β-benzoyloxyethylaniline, N-benzyl-N-β-benzoyloxyethylaniline, N-β-cyanoethyl-N-β-benzoyloxyethyl-meta-toluidine, N-β-acetoxyethyl-N-β-benzoyloxyethyl-meta-toluidine, 1-[N-β-acetoxyethyl-N-β-benzoyloxyethyl]-amino-3-acetylaminobenzene, 1-[N-β-acetoxyethyl-N-β-benzoyloxyethyl]-amino-2-methoxy-5-acetylaminobenzene, N-β-cyanoethyl-N-β-phenacetoxyethylaniline, N-β-cyanoethyl-N-β-cinnaomoyloxyethylaniline, N-ethyl-N-β-(α-furoyl)-oxyethylaniline, N-β-cyanoethyl-N-β-(α-furoyl)-oxyethylaniline, N-bis-β-[(α-furoyl)-oxyethyl]-aniline, N-β-cyanoethyl-N-β-(α-tetrahydrofuroyl)-oxyethylaniline, N-bis-[β-(α-tetrahydrofuroyl)-oxyethyl]-aniline, N-bis-[β-(α-tetrahydrofuroyl)-oxyethyl]-meta-toluidine, N-β-acetoxyethyl-N-β-(α-thienoyl)-oxyethylaniline, N-β-cyanoethyl-N-β-(α-thienoyl)-oxyethylaniline, N-bis-[β-(α-thienoyl)-oxyethyl]-aniline and N-β-benzoyloxyethyl-N-β-tetrahydrofuroyloxyethylaniline.

It is also possible to use a mixture of different coupling components and, in many cases, the dyestuffs obtained display better affinity and building-up properties than dyestuffs obtained with a single coupling component.

Diazotization of the above-mentioned diazo components may be carried out by methods known per se, for example, with a mineral acid, particularly hydrochloric acid, and sodium nitrite, or, for example, with a solution of nitrosyl-sulphuric acid in concentrated sulphuric acid.

Coupling may also be carried out by a known method, for example, in a neutral to acid medium, if necessary, in the presence of sodium acetate or a similar buffer which influences the rate of coupling, or a catalyst, for example, pyridine or a salt thereof.

After coupling, the dyestuffs formed can easily be separated from the coupling mixture, for example, by filtration, because they are virtually insoluble in water.

In process (b) of the invention the starting materials used are advantageously azo dyestuffs of the formula

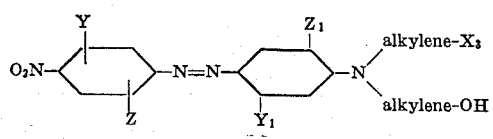

in which Y, Z, $Y_1$ and $Z_1$ have the meanings given above and $X_3$ represents a hydrogen atom or a hydroxy, alkoxy cyano or carbalkoxy group.

The starting material is monoacylated or diacylated either with a halide or an anhydride of a five-membered heterocyclic carboxylic acid, a six-membered, nitrogen-free heterocyclic carboxylic acid, a phenylalkanecarboxylic acid or a cinnamic acid, or monoacylated with a benzoic acid halide or anhydride and, if necessary, monoacylated with a chloride or anhydride of one of the above-mentioned heterocyclic carboxylic acids.

It is expedient to carry out acylation in an inert organic solvent, for example, pyridine, benzene, dioxane, isopropylether, ethyl acetate or dimethylformamide. When manufacturing compounds acylated with a single acylating agent, it is possible to use a large excess of the acylating agent instead of a solvent.

The new dyestuffs are eminently suitable for dyeing and printing materials, especially fibres and fabrics, made, for example, from cellulose triacetate and polyamides, but particularly aromatic polyesters. They produce on these materials strong dyeings possessing very good properties of fastness, especially very good fastness to light, sublimation and rubbing. The dyestuffs are also suitable for materials to be subjected to the "permanent press" process, for example, the Koratron process. Dyeings thus treated display very good properties of wet fastness and very good fastness to heat. The new dyestuffs are also eminently suitable for textured polyester yarn. In contrast to other dyestuffs, they produce dyeings which are free from streakiness.

For dyeing, the new dyestuffs are advantageously used in a finely divided form, and dyeing is carried out in the presence of a dispersing agent, for example, soap, sulphite cellulose waste liquor or a synthetic detergent, or a combination of different wetting and dispersing agents. Prior to dyeing, it is generally advantageous to convert the dyestuff into a dyeing preparation which contains a dispersing agent and the dyestuff in a form such that a fine dispersion is obtained when the preparation is diluted with water. Such dyestuff preparations may be obtained in known manner, for example, by reprecipitating the dyestuff from sulphuric acid and grinding the suspension so obtained with sulphite cellulose waste liquor. If necessary, they may also be obtained by grinding the dyestuff in a highly efficient grinding device in the dry or wet state in the presence or absence of a dispersing agent.

To obtain stronger dyeings on polyethylene terephthalate fibres it is generally advantageous to add a swelling agent to the dyebath, or more especially to carry out the dyeing process under superatmospheric pressure at a temperature above 100°C, for example, at 120°C. Suitable swelling agents are aromatic carboxylic acids, for example, benzoic acid and salicyclic acid; phenols, for example, ortho- or para-hydroxydiphenyl; aromatic halogenated compounds, for example, chlorobenzene, ortho-dichlorobenzene and trichlorobenzene; and phenylmethylcarbinol or diphenyl. When carrying out the dyeing process under superatmospheric pressure it is generally advantageous to render the dyebath slightly acidic, for example, by the addition of a weak acid, for example, acetic acid.

By virtue of their fastness to alkali, the new dyestuffs are specially suitable for application by the so-called thermofixation process in which the material to be dyed is impregnated at a temperature not exceeding 60°C with an aqueous dispersion of the dyestuff which advantageously contains 1 to 50 percent of urea and a thickening agent, especially sodium alginate, and then squeezed in the usual manner. The impregnated material is advantageously squeezed so as to retain 50 to 100 percent of its dry weight of dye-liquor.

To fix the dyestuff, the material so impregnated is heated to a temperature above 100°C, for example, to a temperature between 180° and 220°C, advantageously after drying, for example, in a current of warm air.

The aforementioned thermofixation process is specially suitable for the dyeing of union fabrics made from polyester fibres and cellulosic fibres, especially cotton. In this case, in addition to the dyestuffs of the invention, the padding liquor contains dyestuffs suitable for dyeing cotton, especially vat dyestuffs, or reactive dyestuffs, that is to say, dyestuffs capable of being fixed on the cellulosic fibre with formation of a chemical bond, for example, dyestuffs which contain a chlorotriazine or chlorodiazine residue. In the latter case, it is generally advantageous to add an agent capable of binding acid to the padding liquor, for example, an alkali metal carbonate, an alkali metal phosphate, an alkali metal borate or an alkali metal perborate, or mixtures thereof. When using vat dyestuffs, the padded fabric must be treated after the heat treatment with an aqueous alkaline solution of one of the reducing agents commonly used in vat dyeing. By virtue of the fact that the dyestuffs of the invention reserve well on wool, they are eminently suitable for dyeing union fabrics made from polyester fibre and wool.

The dyeings obtained are advantageously subjected to an after-treatment, for example, by heating with an aqueous solution of a non-ionic detergent.

The dyestuffs may also be applied by printing processes. In this method of application a printing paste is used which contains, for example, in addition to the usual printing adjuvants, for example, thickening and wetting agents, the finely divided dyestuff, if necessary, in admixture with one of the above-mentioned cotton dyestuffs, if necessary, together with urea and/or an agent capable of binding acid.

The following Examples illustrate the invention. Unless otherwise stated, the parts and percentages are by weight.

EXAMPLE 1

1.63 Parts of 2-cyano-4-nitroaniline are added in portions to 15 parts of monohydrate in which 0.7 part of sodium nitrite has been dissolved. After some time, this diazo component is discharged on to 100 parts of ice, the excess of nitrite is destroyed, and a solution of 3 parts of N-β-cyanoethyl-N-β-benzoyloxyethylaniline in 75 parts of glacial acetic acid is added. After some time, the batch is buffered at a temperature not exceeding 10°C with a 30 percent sodium hydroxide solution, which process completely precipitates the dyestuff. The dyestuff so obtained dyes polyester fibres red shades possessing excellent fastness to light and sublimation.

The following table lists components for further dyestuffs. The dyestuffs may be obtained by diazotizing the diazo components shown in Column I and then coupling the diazo compound with the coupling components shown in Column II. The shades obtained on polyester fibres are indicated in Column III.

| I | II | III |
|---|---|---|
| 1. 2,6-dichloro-4-nitroaniline. | N-β-cyanoethyl-N-β-benzoyloxy-ethylaniline. | Orange. |
| 2. 2-chloro-4-nitroaniline. | ...do... | Do. |
| 3. 2-cyano-4-nitroaniline. | Cinnamic acid ester of N-β-cyanoethyl-N-β-oxyethylaniline. | Red. |
| 4. ...do... | Phenylacetic acid ester of N-β-cyanoethyl-N-β-oxyethylaniline. | Red. |

| I | II | III |
|---|---|---|
| 5. 2,6-dichloro-4-nitroaniline | ⬡—N(C₂H₄CN)(C₂H₄OCOCH=CHC₆H₅) | Orange. |
| 6. 2-chloro-4-nitroaniline | ⬡—[N(C₂H₄OCO—C(S)(CH)—C(CH)—)]₂ | Ruby. |
| 7. 2-cyano-4-nitroaniline | ⬡—N(C₂H₄—CN)(C₂H₄—O—C(O)—C(S)(CH)—C(CH)—C(O)—OCH₃) | Red. |
| 8. 2-chloro-4-nitroaniline | ⬡—N(C₂H₄—CN)(C₂H₄—O—C(O)—C(S)(CH)—C(CH)—C(O)—CCOCH₃) | Orange-red. |
| 9. 2-cyano-4-nitroaniline | ⬡—N(C₂H₄—CN)(C₂H₄—O—C(O)—CH(O)(CH₂)—CH₂—CH₂) | Red. |
| 10. 2-chloro-4-nitroaniline | Same as above | Orange-red. |
| 11. 2,4-dinitro-6-chloroaniline | ⬡(OCH₃)(NHCCH₃(O))—N—[(C₂H₄—O—C(O)—C(S)(CH)—C(CH)—C(O)—COCH₃)]₂ | Navy blue. |

Continued

| | I | II | III |
|---|---|---|---|
| 12 | 2-cyano-4-nitroaniline | [structure: N(C₂H₄-CN)(C₂H₄-O-CO-) cyclohexyl with CH₃, attached to furan-like ring CH=CH-CH=CH-O] | Red. |
| 13 | do | [structure: N(C₂H₄-CN)(C₂H₄-O-CO-) cyclohexyl with OCH₃, attached to thiophene ring] | Red. |
| 14 | 2,6-dichloro-4-nitroaniline | [structure: N(C₂H₄-CN)(C₂H₄-O-CO-) cyclohexyl, attached to furan ring] | Orange. |
| 15 | 2-chloro-4-nitroaniline | Same as above | Do. |
| 16 | 4-nitroaniline | do | Yellow-orange. |
| 17 | 2-cyano-4-nitroaniline | do | Red. |
| 18 | 2-cyano-4-nitroaniline | [structure: N(C₂H₄-CN)(C₂H₄OCO-) cyclohexyl attached to phenyl with CH₃] | Red. |
| 19 | do | [structure: N(C₂H₄-CN)(C₂H₄OCO-) cyclohexyl attached to phenyl with OCH₃] | Red. |
| 20 | do | [structure: N(C₂H₄CN)(C₂H₄OCO-) cyclohexyl attached to phenyl with OC₂H₅] | Red. |
| 21 | 2-chloro-4-nitroaniline | [structure: N(C₂H₄CN)(CH₄OCO-) cyclohexyl attached to phenyl with Cl] | Orange. |
| 22 | [structure: O₂N-phenyl-COOCH₃ with NH₂] | [structure: N(C₂H₄CN)(C₂H₄-OCO-) cyclohexyl attached to furan ring] | Scarlet. |
| 23 | [structure: O₂N-benzothiazole-C-NH₂] | [structure: N(C₂H₄CN)(C₂H₄-OCO-) cyclohexyl attached to furan ring] | Red. |
| 24 | [structure: C₂H₅O-benzothiazole-C-NH₂] | Same as above | Orange. |
| 25 | [structure: O₂N-thiazole-NH₂] | do | Violet. |
| 26 | 2-cyano-4-nitroaniline | [structure: N(C₂H₄CN)(C₂H₄-O-CO-) cyclohexyl attached to thiophene ring] | Red. |

EXAMPLE 2

7.3 Parts of 2-cyano-4-nitro-4'-(N-β-cyanoethyl-N-β-hydroxyethyl)-aminoazobenzene are dissolved in 200 parts of pyridine, the solution is cooled to 10° to 15°C and then 3 parts of furan-2-carboxylic acid chloride are added dropwise at that temperature. The batch is stirred for 1½ hours at 10° to 15°C, discharged on to 250 parts of ice and then acidified with concentrated hydrochloric acid while cooling with ice. The dyestuff is isolated by filtration and washed until the washings run neutral. It dyes polyester fibres red shades possessing excellent fastness to light and sublimation.

EXAMPLE 3

A dyestuff which dyes polyester fibres red shades possessing excellent fastness to light and sublimation may be obtained by replacing the 3 parts of furan-2-carboxylic acid chloride given in Example 2 with 3.5 parts of thiophene-2-carboxylic acid chloride.

EXAMPLE 4

A dyestuff which dyes polyester fibres red shades possessing excellent fastness to light and sublimation may be obtained by replacing the 3 parts of furan-2-carboxylic acid chloride given in Example 2 with 3 parts of tetrahydrofuran-2-carboxylic acid chloride.

EXAMPLE 5

A dyestuff which dyes polyester fibres red shades possessing excellent fastness to light and sublimation may be obtained by replacing the 3 parts of furan-2-carboxylic acid chloride given in Example 2 with 4.5 parts of thiophene-2-carboxylic acid chloride-5-carboxylic acid methylester.

Dyeing Procedure

1 Part of the dyestuff obtained in the manner described in the first paragraph of Example 1 is ground wet with 2 parts of a 50 percent aqueous solution of the sodium salt of dinaphthylmethane-2,2'-disulphonic acid and the batch is dried.

The dyestuff preparation so obtained is mixed with 40 parts of a 10 percent aqueous solution of a condensation product obtained from octadecyl alcohol and 20 mols of ethylene oxide, and then 4 parts of a 40 percent acetic acid solution are added. A dyebath of 4,000 parts is prepared therefrom by dilution with water.

100 Parts of a cleansed polyester fibre material are entered into this bath at 50°C, the temperature is raised to 120° to 130°C within half an hour and dyeing is carried out for 1 hour at that temperature in a closed vessel. The material is then well rinsed. A strong red dyeing possessing excellent fastness to light and sublimation is obtained.

We claim:

1. A water-insoluble monoazo dyestuff of the formula

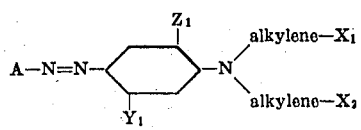

in which alkylene has at most 2 carbon atoms, A represents thiazolyl or thiazolyl substituted by nitro, cyano, methyl, or phenyl groups, benzthiazolyl or benzthiazolyl substituted by chlorine, cyano, lower alkoxy or nitro groups, thiadiazolyl or a group of the formula

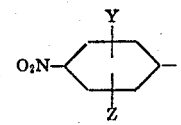

Y represents hydrogen, chlorine, bromine, lower alkyl, lower alkoxy, phenoxy, nitro, cyano, lower carbalkoxy or lower alkylsulphonyl, Z represents hydrogen, chlorine, bromine, lower alkyl, cyano or trifluoromethyl, $Y_1$ represents hydrogen, chlorine, bromine, lower alkyl, lower alkoxy, phenoxy or lower alkanoylamino, $Z_1$ represents hydrogen, lower alkyl or lower alkoxy, $X_1$ represents hydrogen, lower alkoxy, cyanoethoxy or phenyl, and $X_2$ is

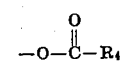

in which $R_4$ is phenyl or phenyl substituted by chlorine, lower alkyl or lower alkoxy.

2. A water-insoluble monoazo dyestuff according to claim 1 of the formula

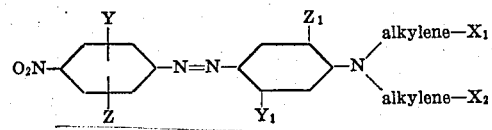

in which alkylene has at most two carbon atoms, Y represents hydrogen, chloro, bromo, lower alkyl, lower alkoxy, phenoxy, nitro, cyano, lower carbalkoxy or lower alkylsulphonyl, Z represents hydrogen, chloro, bromo, lower alkyl, cyano or trifluoromethyl, $Y_1$ represents hydrogen, chloro, bromo, lower alkyl, lower alkoxy, phenoxy or lower alkanoylamino, $Z_1$ represents hydrogen, lower alkyl or lower alkoxy, $X_1$ represents hydrogen, lower alkoxy, cyanoethoxy, phenyl, and $X_2$ is

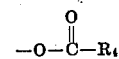

in which $R_4$ is phenyl or phenyl substituted by chlorine, lower alkyl, or lower alkoxy.

3. A dyestuff according to claim 1 in which $X_1$ is phenyl, lower alkyl or cyanoethoxy.

4. A dyestuff according to claim 3 in which $R_4$ is phenyl.

5. A dyestuff according to claim 4 in which $X_1$ is phenyl.

6. A dyestuff according to claim 4 in which $X_1$ is lower alkoxy.

7. A dyestuff according to claim 4 in which $X_1$ is cyanoethoxy.

* * * * *